(12) United States Patent
Twelves et al.

(10) Patent No.: US 11,105,265 B2
(45) Date of Patent: Aug. 31, 2021

(54) SUPPLEMENTAL COOLING AIR FOR TURBINE EXHAUST COMPONENTS AND SURFACES

(71) Applicant: United Technologies Corporation, Farmington, CT (US)

(72) Inventors: Wendell Twelves, Glastonbury, CT (US); Arthur Salve, Tolland, CT (US); Jeffrey Prausa, Simsbury, CT (US); Douglas Thonebe, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 633 days.

(21) Appl. No.: 15/256,104

(22) Filed: Sep. 2, 2016

(65) Prior Publication Data

US 2018/0066584 A1    Mar. 8, 2018

(51) Int. Cl.
| | | |
|---|---|---|
| *F02C 7/18* | (2006.01) | |
| *F01D 25/12* | (2006.01) | |
| *F02C 7/32* | (2006.01) | |
| *F01D 15/10* | (2006.01) | |
| *B64D 33/08* | (2006.01) | |
| *B64D 29/00* | (2006.01) | |

(Continued)

(52) U.S. Cl.
CPC ............... *F02C 7/18* (2013.01); *B64D 29/00* (2013.01); *B64D 33/08* (2013.01); *F01D 9/065* (2013.01); *F01D 15/10* (2013.01); *F01D 25/12* (2013.01); *F02C 7/32* (2013.01); *F04D 19/02* (2013.01); *F04D 25/06* (2013.01); *F05D 2260/20* (2013.01); *F05D 2260/202* (2013.01); *Y02T 50/60* (2013.01)

(58) Field of Classification Search
CPC ... F02C 7/18; F02C 7/32; B64C 41/00; F04D 19/02; F04D 25/06; F01D 9/065; F01D 15/10; F01D 25/12; F05D 2260/20; F05D 2260/202; Y02T 50/676
See application file for complete search history.

(56) References Cited

U.S. PATENT DOCUMENTS

| | | | | |
|---|---|---|---|---|
| 2,789,416 A | * | 4/1957 | Mirza | F02K 1/04 60/266 |
| 3,528,246 A | * | 9/1970 | Fischer | F02K 3/06 415/144 |

(Continued)

FOREIGN PATENT DOCUMENTS

| | | | | |
|---|---|---|---|---|
| EP | 2960467 | 12/2015 | | |
| WO | WO-2015052458 A1 | * | 4/2015 | G07C 5/0808 |

OTHER PUBLICATIONS

Euopean Patent Office, European Search Report dated Jan. 25, 2015 in Application No. 17185566.1-1007.

(Continued)

*Primary Examiner* — Igor Kershteyn
*Assistant Examiner* — Joshua R Beebe
(74) *Attorney, Agent, or Firm* — Snell & Wilmer L.L.P.

(57) ABSTRACT

A supplemental cooling air system for a turbine engine may comprise a compressor having an inlet and an outlet, and an electric motor operatively coupled to the compressor and configured to drive the compressor. The inlet may receive air from at least one of a freestream flow path, a bypass flow path, or an engine bay. The outlet may supply the air to at least a portion of the turbine engine for cooling.

17 Claims, 6 Drawing Sheets

(51) Int. Cl.
*F01D 9/06* (2006.01)
*F04D 19/02* (2006.01)
*F04D 25/06* (2006.01)

(56) References Cited

U.S. PATENT DOCUMENTS

| | | | | |
|---|---|---|---|---|
| 3,543,873 A * | 12/1970 | Toy | ............ | F16H 41/04 180/305 |
| 5,136,837 A * | 8/1992 | Davison | ............ | F02C 6/08 60/39.183 |
| 5,379,583 A * | 1/1995 | Zickwolf, Jr. | ............ | F02C 9/20 60/794 |
| 5,414,992 A * | 5/1995 | Glickstein | ............ | B64D 13/006 60/39.83 |
| 5,553,449 A * | 9/1996 | Rodgers | ............ | F02C 7/12 60/204 |
| 5,724,806 A * | 3/1998 | Horner | ............ | F02C 7/12 60/728 |
| 5,813,609 A * | 9/1998 | Ellerhorst | ............ | F02K 1/1223 239/127.3 |
| 6,050,080 A * | 4/2000 | Horner | ............ | F02C 7/12 60/728 |
| 6,578,362 B1 * | 6/2003 | Coffinberry | ............ | F02C 7/12 60/730 |
| 8,092,153 B2 * | 1/2012 | Strecker | ............ | F01D 9/065 415/115 |
| 8,833,053 B2 * | 9/2014 | Chir | ............ | F02C 6/08 60/39.5 |
| 8,858,161 B1 | 10/2014 | Ryznic | | |
| 8,893,510 B2 * | 11/2014 | Tham | ............ | F01D 5/088 60/785 |
| 2008/0041033 A1 * | 2/2008 | Durocher | ............ | F02K 1/04 60/226.1 |
| 2010/0150700 A1 * | 6/2010 | Strecker | ............ | F01D 9/065 415/116 |
| 2010/0223902 A1 * | 9/2010 | Mailander | ............ | H05K 7/20445 60/39.83 |
| 2015/0275769 A1 | 10/2015 | Foutch | | |
| 2016/0069264 A1 | 3/2016 | Brostmeyer | | |

OTHER PUBLICATIONS

European Patent Office, European Office Action dated Mar. 12, 2020 in Application No. 17185566.1.

* cited by examiner

SUPPLEMENTAL COOLING AIR FOR TURBINE EXHAUST COMPONENTS AND SURFACES

FIELD

This disclosure relates generally to cooling systems for gas turbine engines, and more particularly to cooling systems for turbine engine exhaust components.

BACKGROUND

Gas turbine engines can include a fan section, a compressor section, a combustor section, a turbine section, and an exhaust section. The fan section includes fan blades for compressing a portion of incoming air to produce thrust and also for delivering a portion of air to the compressor section. Air entering the compressor section is compressed and delivered into the combustor section where it is mixed with fuel and ignited to generate a high-speed exhaust gas flow. The high-speed exhaust gas flow expands through the turbine section to drive the compressor section and exits through the exhaust section.

Turbine engine exhaust ducts, turbine exhaust case (TEC) vanes, tail cones, bearing housing, liners, walls, flaps, decks, etc. are exposed to this high-temperature, high-speed exhaust gas. Generally, portions of the exhaust section are cooled by cooling air from the compressor section.

SUMMARY

A supplemental cooling air system for a turbine engine may comprise a compressor having an inlet and an outlet, and an electric motor operatively coupled to the compressor and configured to drive the compressor, wherein the inlet is configured to receive air from at least one of a freestream flow path, a bypass flow path, or an engine bay, and wherein the outlet is configured to supply the air to at least a portion of the turbine engine for cooling.

In various embodiments, the electric motor may be in electronic communication with an electronic speed control. The electronic speed control may be in electronic communication with a full authority digital engine control (FADEC). The supplemental cooling air system may further comprise a temperature sensor in electronic communication with the FADEC and configured sense a temperature at a location in close proximity to the outlet. The outlet may comprise a cooling duct configured to be coupled to an exhaust structure and configured to direct cooling air to an inner surface of a nozzle. The cooling air may be configured to provide film cooling to the nozzle. The outlet may comprise a cooling duct configured to be coupled to an inner surface of a tail cone and configured to direct cooling air to an inner surface of the tail cone. The cooling air may be configured to provide convective cooling to the tail cone. The outlet may be configured to supply cooling air to a cooling hole disposed in an exhaust structure. The outlet may be configured to be coupled to an exhaust outlet of the gas turbine engine at a location aft of an aerodynamic throat of the exhaust outlet.

A gas turbine engine may comprise a fan case housed within a nacelle, at least one of the fan case or the nacelle at least partially defining a bypass flow path, a compressor section configured to receive a core air flow, a turbine section configured to drive the compressor section, an exhaust section, and a supplemental cooling air system comprising a compressor having an inlet and an outlet, the compressor being driven by an electric motor, wherein the outlet supplies cooling air to at least a portion of the gas turbine engine.

In various embodiments, the outlet may supply cooling air to the exhaust section. The inlet may be coupled to an aerodynamic surface exposed to a free stream flow path. The inlet may be coupled to an aerodynamic surface exposed to the bypass flow path. The outlet may comprise a cooling duct coupled to an exhaust structure and configured to direct cooling air to an inner surface of a nozzle. The outlet may comprise a cooling duct coupled to an inner surface of a tail cone and configured to direct cooling air to an inner surface of the tail cone, the tail cone comprising an aperture disposed in an aft end of the tail cone, whereby the cooling air exits the tail cone. The outlet may comprise a cooling hole disposed in an exhaust structure of the exhaust section. The outlet may be coupled to an exhaust outlet of the gas turbine engine at a location aft of an aerodynamic throat of the exhaust outlet.

A method of delivering cooling air to a gas turbine engine may comprise receiving, by a compressor, air from at least one of a free stream flow path, a bypass flow path, or an engine bay, driving, by an electric motor, the compressor, compressing, by the compressor, the air, and receiving, by at least a portion of the gas turbine engine, the compressed air.

In various embodiments, the receiving may be performed by at least one of a tail cone or an exhaust outlet surface.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

Figure 1:
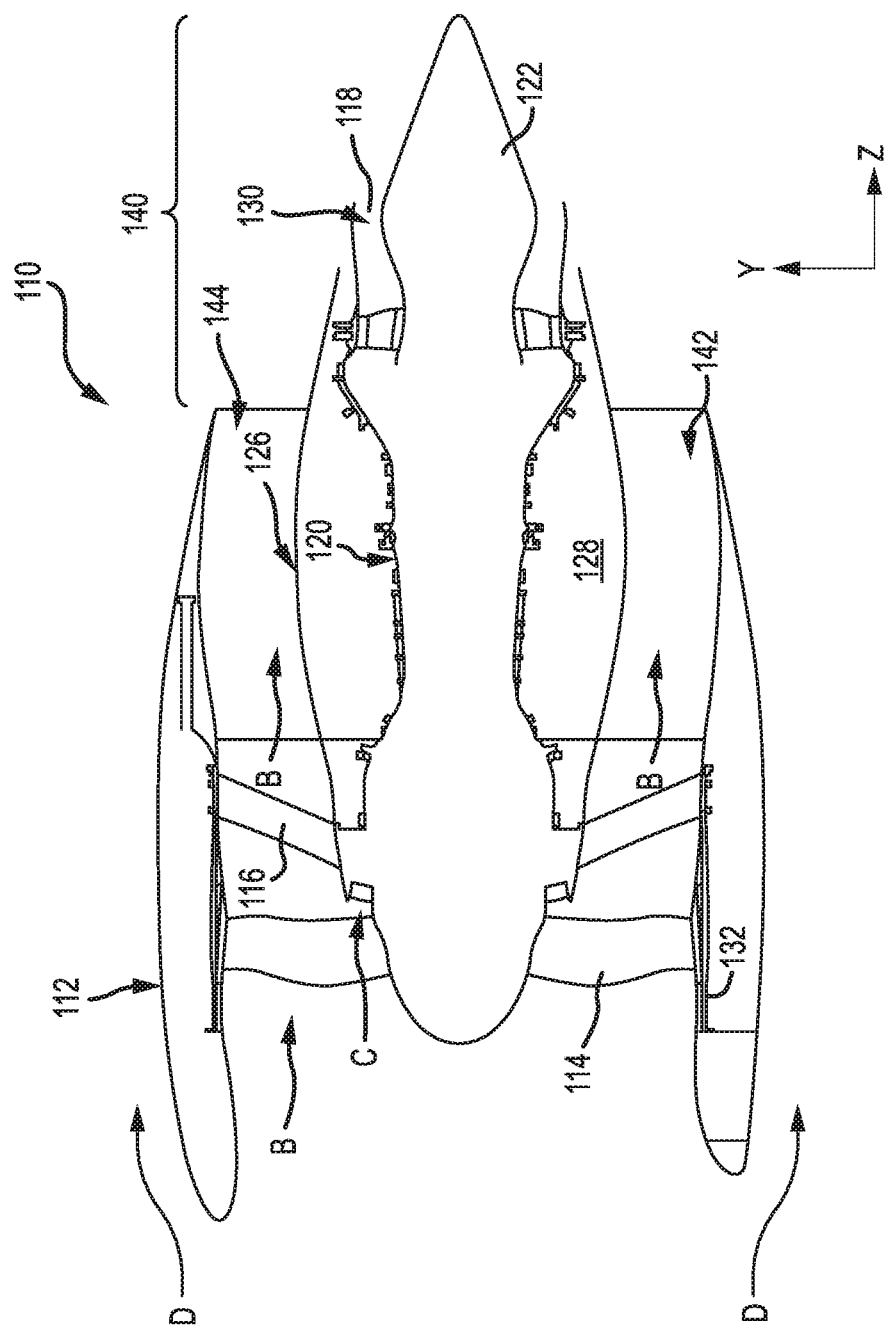
FIG. 1 illustrates a side cutaway view of a turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Typically, gas turbine engines use air diverted from the compressor section or fan section for providing cooling air to various portions of the engine. Practical limits to the amount of air that can be bled from the fan section and/or compressor section may restrict the useful life of engine components, including engine exhaust components.

Supplemental cooling air systems, as provided herein, may be useful for cooling components of a turbine engine, including exhaust components. A supplemental cooling air system may include a compressor driven by an electric motor. The compressor may have an inlet and an outlet. The inlet may receive free stream air, engine bay air, and/or by-pass air as a supplemental cooling air source. Free stream air may comprise air which passes radially outward from a nacelle inlet or which passes over (or under) an aerodynamic body such as a wing. The outlet may supply the cooling air to an exhaust component (i.e., turbine engine exhaust ducts, turbine exhaust case (TEC) vanes, tail cones, bearing housing, liners, walls, flaps, decks, etc). In this regard, the supplemental cooling air system, as disclosed herein, does not use engine core air as a source of cooling air. Supplemental cooling air systems, as described herein, may be useful for turbine engines for military aircraft, in accordance with various embodiments.

FIG. 1 illustrates a schematic view of a gas turbine engine, in accordance with various embodiments. A yz-axes is provided for ease of illustration. Gas turbine engine 110 may include core engine 120. Core engine 120 may include an inlet, a compressor section, a combustor section, a turbine section, and an exhaust section 140. Core air flow C flows through core engine 120 and is expelled through exhaust outlet 118 surrounding tail cone 122. Exhaust outlet 118 may comprise an aerodynamic throat 130, in accordance with various embodiments.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within nacelle 112. In this regard, fan case 132 may at least partially define bypass flow path B. Air may flow in the aft direction relative to and radially outward from nacelle 112 in free stream flow path D.

Nacelle 112 typically comprises two halves which are typically mounted to a pylon. According to various embodiments, multiple guide vanes 116 may extend radially between core engine 120 and fan case 132. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or compressed air ducts, for example. In various embodiments, core compartment 128 may comprise an engine bay.

It should be appreciated that the pressure forward of an aerodynamic throat 130 is generally greater than the pressure aft of the aerodynamic throat 130. Thus, a pressure gradient may exist across a gas turbine engine exhaust flow path. The aerodynamic throat 130 may be located aft of a turbine section of core engine 120.

Figure 2:
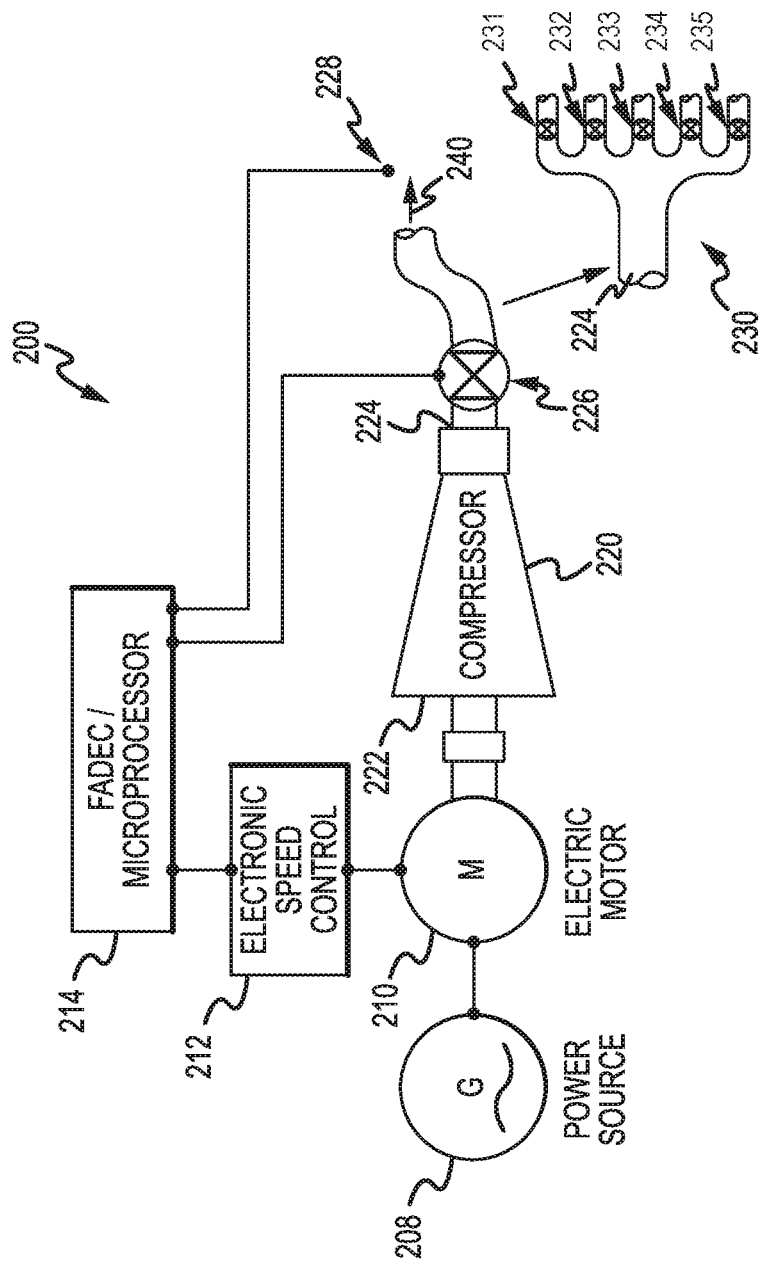
FIG. 2 illustrates a schematic view of a supplemental cooling air system, in accordance with various embodiments.
Figure 3:
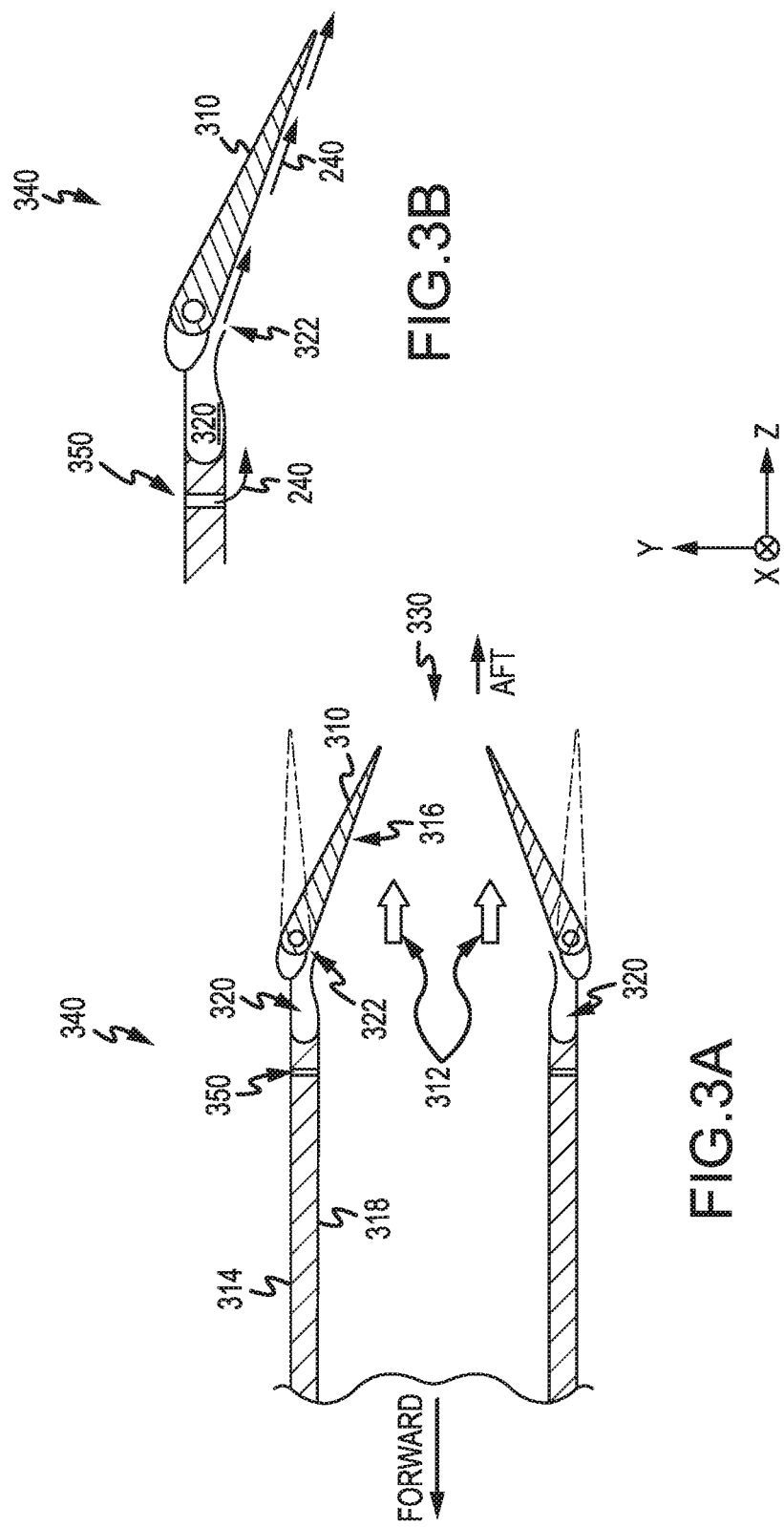
FIGS. 3A and 3B illustrate the outlet of the supplemental cooling air system of FIG. 2 installed onto an exhaust section, in accordance with various embodiments.
Figure 4:
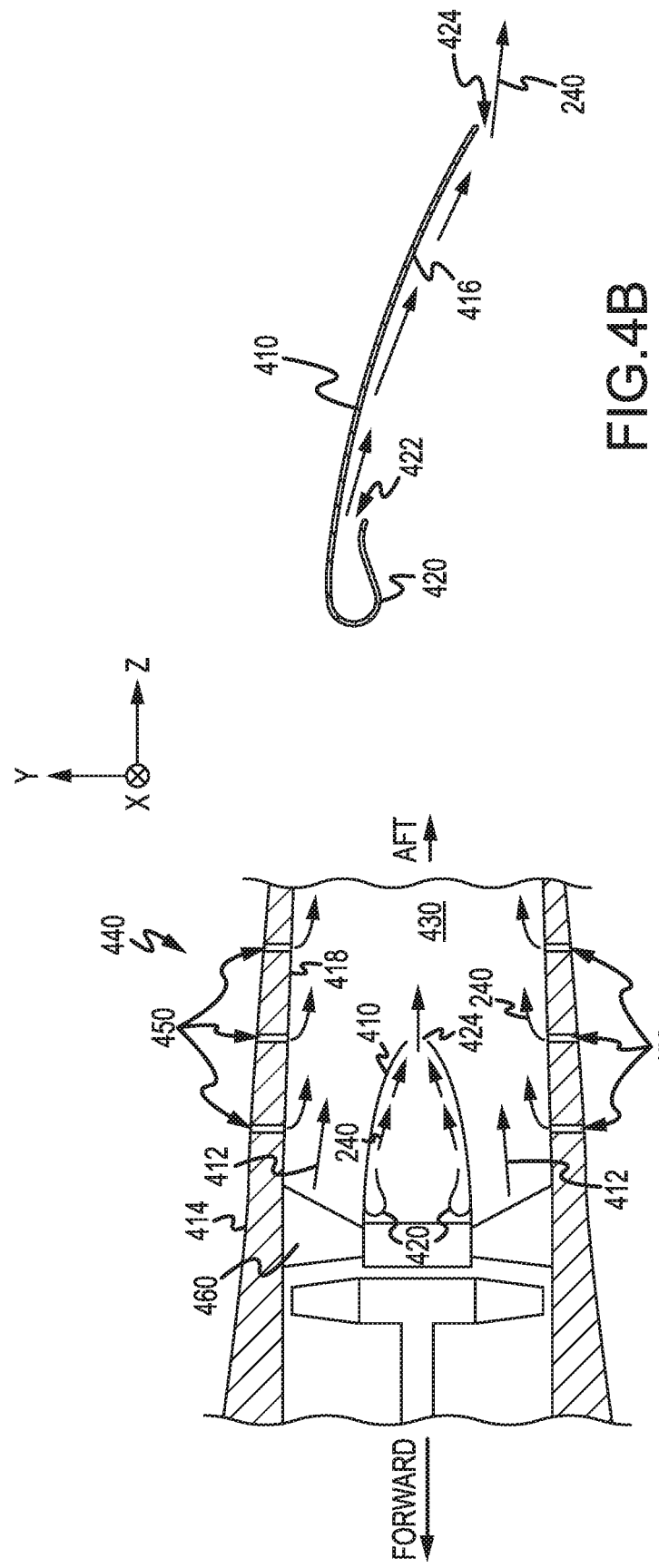
FIGS. 4A and 4B illustrate the outlet of the supplemental cooling air system of FIG. 2 installed onto an exhaust section, in accordance with various embodiments.

With reference to FIG. 2, a schematic view of a supplemental cooling air system 200 is illustrated, in accordance with various embodiments. Cooling air system 200 may include an electric motor 210 and a compressor 220 mechanically coupled to electric motor 210. For example, compressor 220 may be mechanically coupled to electric motor 210 via a shaft. Electric motor 210 may drive compressor 220. In this regard, compressor 220 may comprise a rotating member which rotates in response to electric motor 210. In various embodiments, electric motor 210 may comprise a brushless motor. In various embodiments, electric motor 210 may comprise a brushed motor. In various embodiments, electric motor 210 may comprise an AC electric motor comprising a three-phase induction motor.

In various embodiments, compressor 220 may comprise an inlet 222 and an outlet 224. Air may enter compressor 220 via inlet 222, be compressed in compressor 220, and the compressed air may exit compressor 220 via outlet 224. In various embodiments, a controllable valve (valve) 226 may be coupled to outlet 224. While the airflow through outlet 224 may be controllable via electric motor 210, the airflow through outlet 224 may also be controllable via valve 226. Outlet 224 may comprise a single duct or may comprise a plurality of ducts as illustrated by splitter 230. In this regard, a plurality of valves (231, 232, 233, 234, and 235) may be individually controlled via microprocessor 214. Each valve of splitter 230 may control cooling air 240 being supplied to various portions of a gas turbine engine. In various embodiments, it is contemplated that an overpressure monitor system may be provided to prevent an overpressure event of cooling air system 200. For example, a pressure sensor may be provided between compressor 220 and valve 226 and valve 226 may be opened in response to the pressure sensor sensing a pressure above a threshold value.

In various embodiments, electric motor 210 may receive electrical power from power source 208. In various embodiments, power source 208 may comprise a generator, a fuel cell, a battery, or any other suitable power source capable of being stored onboard an aircraft. Electric motor 210 may be in electronic communication with an electronic speed control 212. In various embodiments, electronic speed control 212 may comprise a variable frequency drive (VFD). In various embodiments, electronic speed control 212 may control the rotational speed of electric motor 210. Electronic speed control 212 may be in electronic communication with microprocessor 214. In various embodiments, microprocessor 214 may comprise a full authority digital engine control (FADEC). Microprocessor 214 may send signals to electronic speed control 212 for controlling the speed of electric motor 210. Microprocessor 214 may be in electronic communication with valve 226. A moveable member of valve 226 may be controllable via microprocessor 214 for opening and closing valve 226. In this regard, the moveable portion may be actuated between a fully open position and a fully closed position, and any position therebetween.

In various embodiments, a temperature sensor 228 may be located on or in close proximity to outlet 224. For example, temperature sensor 228 may be coupled to an exhaust component. Temperature sensor 228 may provide feedback to microprocessor 214. Microprocessor 214 may control valve 226 in response to a signal received from temperature sensor 228. For example, valve 226 may be opened in response to a signal indicating an increase in temperature and valve 226 may be closed in response to a signal indicating a decrease in temperature.

In various embodiments, as previously mentioned, air entering inlet 222 may comprise free stream air. In this regard, freestream air, depending on aircraft location geographically as well as altitude, may comprise temperatures of between about −70° F. (−56.7° C.) and about 120° F. (48.9° C.).

In various embodiments, with combined reference to FIG. 1 and FIG. 2, outlet 224 may direct cooling air 240 to an exhaust component located aft of the aerodynamic throat 130 of an exhaust outlet 118. It should be appreciated by those having ordinary skill in the art that pressure aft of the aerodynamic throat 130 is low relative to the pressure forward of the aerodynamic throat 130. Coupling outlet 224 to exhaust section 140 at a location aft of aerodynamic throat 130 may allow for a smaller compressor 220 because the compressor 220 would only have to create enough pressure to overcome the relatively low pressure aft of the aerodynamic throat 130. Thus, in various embodiments, the cooling air system 200 may be relatively compact and lightweight.

In various embodiments, FIG. 3A through FIG. 5 provide various embodiments of outlet 224 coupled to an exhaust section.

With reference to FIG. 3A and FIG. 3B, an exhaust section 340 receiving cooling air 240 from the cooling air system 200 of FIG. 2 is illustrated, in accordance with various embodiments. In various embodiments, exhaust section 340 may be similar to the exhaust section 140 of FIG. 1. Exhaust section 340 may include a nozzle 310. In various embodiments, nozzle 310 may actuate to vary the cross-section area (in the x-y plane) of exhaust outlet 330. In various embodiments, the actuating of nozzle 310 may meter the flow of exhaust gas 312 exiting nozzle 310.

In various embodiments, exhaust section 340 may include a cooling duct 320. In various embodiments, cooling duct 320 may comprise an annular geometry. In various embodiments, cooling duct 320 may comprise a segmented annular geometry. In various embodiments, the cross-section (in the y-z plane) of cooling duct 320 may comprise a generally "C" shape, or sideways "U" shaped, geometry, as illustrated in FIG. 3A. Cooling duct 320 may be coupled to outlet 224 of FIG. 2. Stated another way, outlet 224 (see FIG. 2) may comprise cooling duct 320. In various embodiments, cooling duct 320 may comprise an exit 322. In various embodiments, exit 322 may comprise a slit or slot. In various embodiments, exit 322 may be partially defined by nozzle 310. Cooling duct 320 may receive cooling air 240 and may direct cooling air 240 towards nozzle 310. In various embodiments, cooling air 240 may be directed towards a radially inwards portion 316 of nozzle 310. In this regard, cooling air 240 may provide film cooling to nozzle 310. In various embodiments, cooling duct 320 may be coupled to exhaust structure 314. In various embodiments, cooling duct 320 may be located forward of nozzle 310.

In various embodiments, exhaust section 340 may include a cooling hole 350. Cooling hole 350 may be coupled to outlet 224 of FIG. 2. Stated another way, outlet 224 (see FIG. 2) may comprise cooling hole 350. Cooling hole 350 may extend through exhaust structure 314. Cooling hole 350 may receive cooling air 240 and may direct cooling air 240 towards nozzle 310. Cooling hole 350 may receive cooling air 240 and may direct cooling air 240 towards inner surface 318 of exhaust structure 314. In various embodiments, cooling hole 350 may be located forward of nozzle 310. In various embodiments, cooling hole 350 may comprise a circular, ovular, square, rectangular, or slit shaped geometry. For example, cooling hole 350 may comprise a slit shaped exit circumferentially disposed around exhaust structure 314.

In various embodiments, exhaust structure 314 may comprise an engine case, an inner fixed structure, a nacelle or portion thereof, or an exhaust outlet, including a variable area nozzle, a wing or portion thereof, such as a wash deck, etc.

With reference to FIG. 4A and FIG. 4B, an exhaust section 440 receiving cooling air 240 from the cooling air system 200 of FIG. 2 is illustrated, in accordance with various embodiments. In various embodiments, exhaust section 440 may be similar to the exhaust section 140 of FIG. 1. Exhaust section 440 may include a tail cone 410. Exhaust section 440 may include an exhaust outlet 430.

In various embodiments, exhaust section 440 may include a cooling duct 420. In various embodiments, cooling duct 420 may comprise an annular geometry. In various embodiments, cooling duct 420 may comprise a segmented annular geometry. In various embodiments, the cross-section (in the y-z plane) of cooling duct 420 may comprise a generally "C" shape, or sideways "U" shaped, geometry, as illustrated in FIG. 4A and FIG. 4B. Cooling duct 420 may be coupled to outlet 224 of FIG. 2. Stated another way, outlet 224 (see FIG. 2) may comprise cooling duct 420. In various embodiments, cooling duct 420 may comprise an exit 422. In various embodiments, exit 422 may comprise a high aspect ratio opening, such as a slit or slot for example. In various embodiments, exit 422 may be partially defined by tail cone 410. In various embodiments, exit 422 may comprise an annular slit or slot. Cooling duct 420 may receive cooling air 240 and may direct cooling air 240 towards tail cone 410. In various embodiments, cooling air 240 may be directed towards an inner surface 416 of tail cone 410. In this regard, cooling air 240 may provide convection cooling to tail cone 410. For example, exhaust gas 412 may transfer heat to tail cone 410 and the heat may be transferred from tail cone 410 to cooling air 240 by which the heat may be carried out, by the cooling air 240, through the exhaust outlet 430. Cooling air 240 may exit tail cone 410 via tail cone exit 424. Tail cone exit 424 may comprise an aperture disposed in the tip of tail cone 410. Tail cone exit 424 may be concentric with tail cone 410. In various embodiments, cooling duct 420 may be coupled to tail cone 410. In various embodiments, cooling duct 420 may be located at a forward end of tail cone 410. In various embodiments, cooling duct 420 may be integrally manufactured with tail cone 410. In various embodiments, outlet 224 (see FIG. 2) may be coupled to cooling duct 420 through bifurcation 460.

In various embodiments, exhaust section 440 may include cooling holes 450. Cooling holes 450 may be coupled to outlet 224 of FIG. 2. Stated another way, outlet 224 (see FIG. 2) may comprise cooling holes 450. Cooling holes 450 may extend through exhaust structure 414. Cooling holes 450 may receive cooling air 240 and may direct cooling air 240 into exhaust outlet 430. Cooling holes 450 may receive cooling air 240 and may direct cooling air 240 towards inner surface 418 of exhaust structure 414. In this regard, cooling air 240 may provide film cooling to inner surface 418 of exhaust structure 414. Cooling holes 450 may be located radially outward of tail cone 410.

In various embodiments, exhaust structure 414 may comprise an engine case, an inner fixed structure, a nacelle or portion thereof, or an exhaust outlet, including a variable area nozzle, a wing or portion thereof, such as a wash deck, etc.

Figure 5:
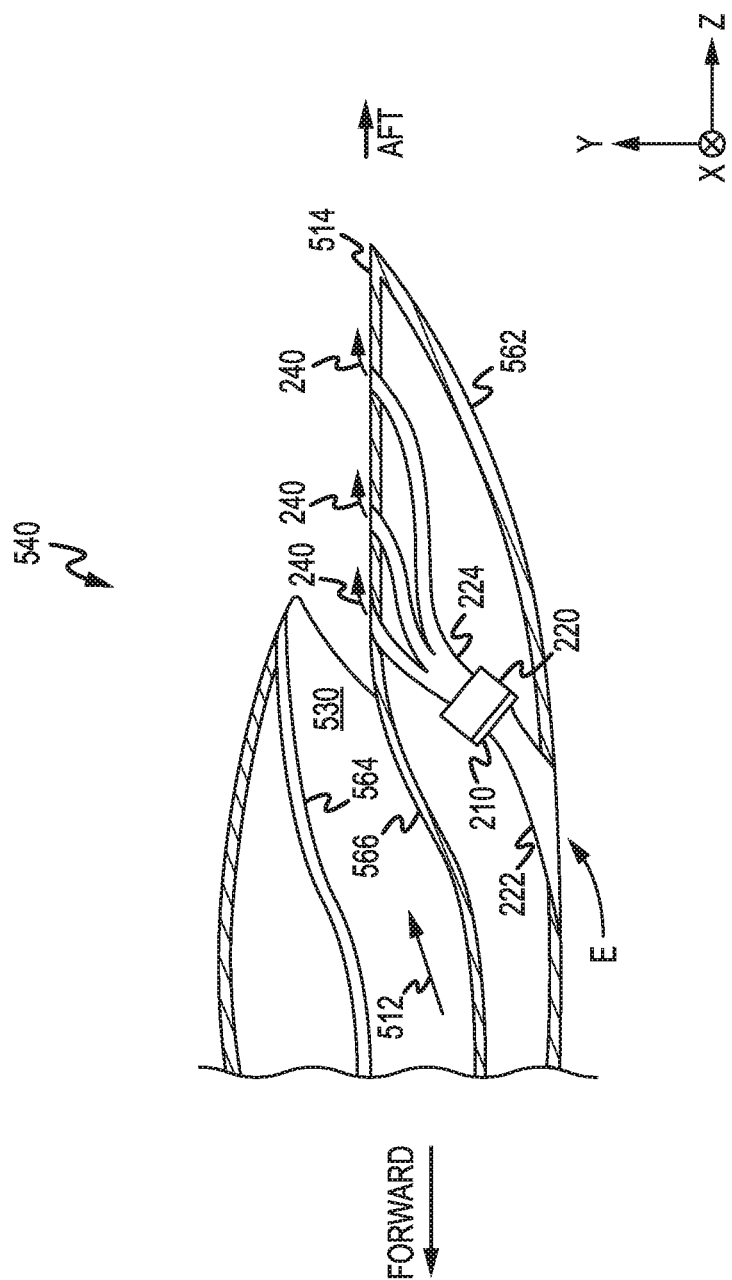
FIG. 5 illustrates a side cutaway schematic view of the supplemental cooling air system of FIG. 2 installed on an exhaust section, in accordance with various embodiments.

With respect to FIG. 5, elements with like element numbering, as depicted in FIG. 2, are intended to be the same and will not necessarily be repeated for the sake of clarity.

With reference to FIG. 5, an exhaust outlet 530 is illustrated receiving cooling air 240 from compressor 220, in accordance with various embodiments. In various embodiments, an exhaust section 540 may include an exhaust structure 514 defining an exhaust outlet 530. In various embodiments, exhaust structure 514 may comprise a wing, a wing wash deck, a wing flap, a nacelle, a nozzle, or any other exhaust structure. Exhaust gas 512 may flow in the aft direction through exhaust outlet 530. Exhaust outlet 530 may be defined by first surface 564 and second surface 566. In various embodiments, first surface 564 may comprise an outer surface and second surface 566 may comprise an inner surface. In various embodiments, first surface 564 may comprise an upper surface and second surface 566 may comprise a lower surface. Exhaust structure 514 may comprise a surface 562. In this regard, surface 562 may comprise an outer surface of a wing, a wing wash deck, a wing flap, a nacelle, a nozzle, or any other exhaust structure. In various embodiments, surface 562 may be exposed to air flow E. In this regard, surface 562 may comprise an aerodynamically smooth surface and thus may be referred to herein as an aerodynamic surface. In various embodiments, air flow E may comprise free stream flow path D (see FIG. 1). In various embodiments, air flow E may comprise bypass flow path B (see FIG. 1). Compressor 220 and electric motor 210 may be coupled between exhaust outlet 530 and surface 562. Air in air flow E may enter compressor 220 and exit as compressed cooling air 240 in or aft of exhaust outlet 530. In this regard, cooling air 240 may provide film cooling to second surface 566.

In various embodiments, with combined reference to FIG. 1 and FIG. 5, air flow E may comprise engine bay air. An engine bay may refer to a void wherein an engine is housed. In this regard, inlet 210 may be coupled to core compartment 128 (see FIG. 1). In this regard, surface 562 may comprise the radially inner surface of IFS 126.

Figure 6:
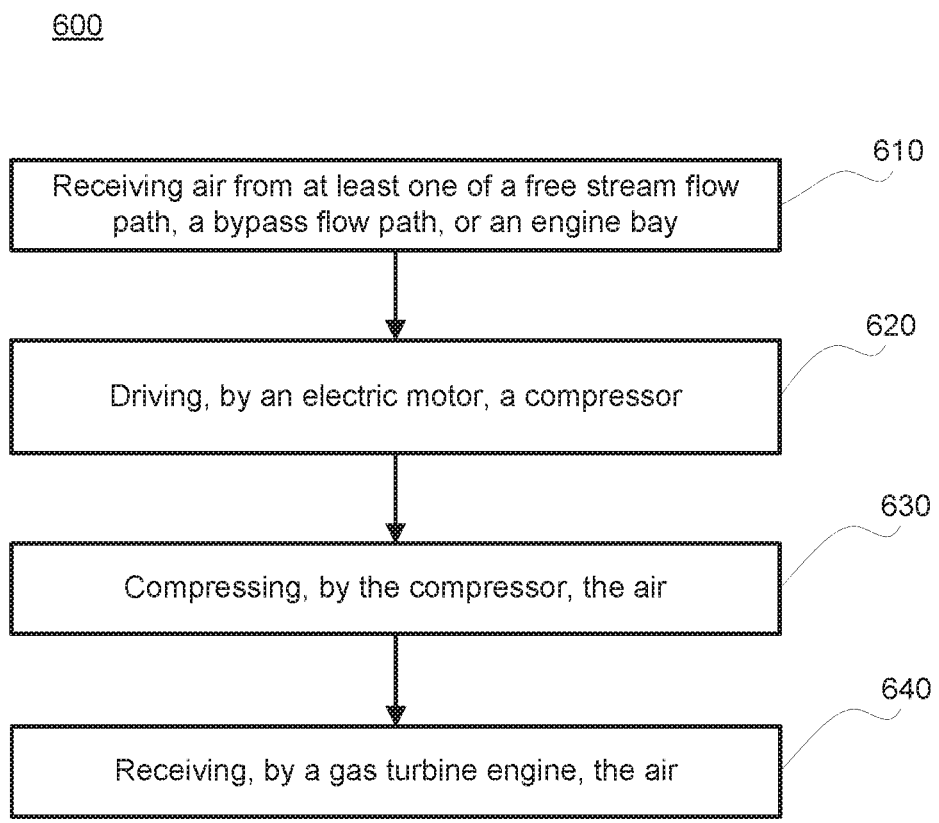
FIG. 6 illustrates a method for delivering cooling air to a gas turbine engine, in accordance with various embodiments.

With reference to FIG. 6, a method 600 for delivering cooling air to a gas turbine engine is provided, in accordance with various embodiments. Method 600 includes receiving air from at least one of a free stream flow path, a bypass flow path, or an engine bay (step 610). Method 600 includes driving, by an electric motor, a compressor (step 620). Method 600 includes compressing, by the compressor, the air (step 630). Method 600 includes receiving, by a gas turbine engine, the air (step 640).

With combined reference to FIGS. 1-6, step 610 may include receiving, by compressor 220, air from at least one of free stream flow path D, bypass flow path B, or an engine bay (i.e., core compartment 128). Step 620 may include driving, by electric motor 210, the compressor 220. Step 630 may include compressing, by compressor 220, the air. Step 640 may include receiving, by at least a portion of the gas turbine engine (i.e., nozzle 310, tail cone 410, exhaust structures 314, 414, and/or 514) the compressed air (i.e., cooling are 240).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A supplemental cooling air system for a turbine engine comprising:
a compressor having an inlet and an outlet;
an electric motor operatively coupled to the compressor and configured to drive the compressor;
an electronic speed control configured to control the rotational speed of the electric motor;
a controller in electronic communication with the electronic speed control;
a valve configured to meter air flowing through the outlet, wherein the valve is controllable via the controller;
an annular cooling duct coupled to an exhaust section, the annular cooling duct comprising an exit; and
a temperature sensor configured to send a signal to the controller, the controller is configured to control a position of the valve using the signal,
wherein in use, in response to the electric motor driving the compressor, the compressor compresses a cooling air, received via the inlet,
the compressor supplies the cooling air, via the outlet, to the annular cooling duct,
the annular cooling duct directs, via the exit, the cooling air towards a proximal surface of the exhaust section,
the inlet is configured to receive the cooling air from at least one of a freestream flow path, a bypass flow path, or an engine bay,
the freestream flow path is independent from a core air flow of the turbine engine,
wherein the proximal surface is an inner surface of a nozzle and the cooling air is configured to provide film cooling to the proximal surface.

2. The supplemental cooling air system of claim 1, wherein the controller comprises a full authority digital engine control (FADEC).

3. The supplemental cooling air system of claim 1, wherein the temperature sensor is configured to sense a temperature at a location in close proximity to the outlet.

4. The supplemental cooling air system of claim 1, wherein the annular cooling duct is configured to be coupled to an inner surface of a tail cone and the proximal surface is an inner surface of the tail cone, and the cooling air is configured to provide convective cooling to the tail cone.

5. The supplemental cooling air system of claim 4, wherein the tail cone comprises a tail cone exit disposed in an aft tip of the tail cone whereby the cooling air exits the tail cone.

6. The supplemental cooling air system of claim 1, wherein the compressor is further configured to supply cooling air to a cooling hole disposed in the exhaust structure whereby the cooling air is directed into an exhaust outlet.

7. The supplemental cooling air system of claim 1, wherein the cooling air is directed into an exhaust outlet of the gas turbine engine at a location aft of an aerodynamic throat of the exhaust outlet.

8. The supplemental cooling air system of claim 1, wherein the inlet is configured to receive air from the freestream flow path.

9. The supplemental cooling air system of claim 1, wherein the inlet is configured to receive air from the engine bay.

10. The supplemental cooling air system of claim 1, wherein the inlet is configured to receive air from the bypass flow path.

11. A gas turbine engine comprising:
a fan case housed within a nacelle, at least one of the fan case or the nacelle at least partially defining a bypass flow path;
a compressor section configured to receive a core air flow;
a turbine section configured to drive the compressor section;
an exhaust section; and
a supplemental cooling air system comprising:
a compressor having an inlet and an outlet, the compressor being driven by an electric motor,
an electronic speed control configured to control the rotational speed of the electric motor;
a controller in electronic communication with the electronic speed control;
a valve configured to meter a cooling air flowing through the outlet, wherein the valve is controllable via the controller;
an annular cooling duct coupled to the exhaust section, the annular cooling duct comprising an exit; and
a temperature sensor configured to send a signal to the controller, the controller is configured to control a position of the valve using the signal,
wherein in use, in response to the electric motor driving the compressor, the compressor compresses air, received via the inlet,
the compressor supplies the cooling air, via the outlet, to the annular cooling duct,
the annular cooling duct directs, via the exit, the cooling air towards a proximal surface of the exhaust section,
the inlet is coupled to an aerodynamic surface exposed to at least one of a free stream flow path and the bypass flow path, wherein the free stream flow path is independent from the core air flow, and
the proximal surface is an inner surface of a nozzle and the cooling air is configured to provide film cooling to the proximal surface.

12. The gas turbine engine of claim 11, wherein the annular cooling duct is coupled to an inner surface of a tail cone and the proximal surface is an inner surface of the tail cone, the tail cone comprising an aperture disposed in an aft end of the tail cone, whereby the cooling air exits the tail cone, and the cooling air is configured to provide convective cooling to the tail cone.

13. The gas turbine engine of claim 12, wherein the cooling air is directed from the aperture into an exhaust outlet of the gas turbine engine at a location aft of an aerodynamic throat of the exhaust outlet.

14. The gas turbine engine of claim 11, further comprising a cooling hole disposed in an exhaust structure of the exhaust section, wherein the cooling hole is configured to receive cooling air from the outlet of the compressor.

15. The gas turbine engine of claim 11, wherein the cooling air is directed into an exhaust outlet of the gas turbine engine at a location aft of an aerodynamic throat of the exhaust outlet.

16. A method of delivering cooling air to a gas turbine engine comprising:
receiving, by a controller, a temperature signal from a temperature sensor;
sending, by the controller, a valve signal to a valve arrangement, wherein a position of the valve arrangement is adjusted in response to the valve arrangement receiving the valve signal;
sending, by the controller, a motor signal to an electronic speed control for controlling a rotational velocity of an electric motor;

sending, by the electronic speed control, a power signal to the motor in response to the electronic speed control receiving the electric motor signal from the controller;

receiving, by a compressor, air from at least one of a free stream flow path, a bypass flow path, or an engine bay;

driving, by the electric motor, the compressor, in response to the electric motor receiving the power signal from the electronic speed control;

compressing, by the compressor, the air; and receiving, by an annular cooling duct coupled to an exhaust section of the gas turbine engine, the compressed air from an outlet of the compressor, wherein the freestream flow path is independent from a core air flow of the gas turbine engine, the annular cooling duct comprises an exit, and the annular cooling duct directs, via the exit, the cooling air towards a proximal surface of the exhaust section, wherein the proximal surface is an inner surface of a nozzle and the cooling air is configured to provide film cooling to the proximal surface.

17. The method of claim 16, wherein the receiving is performed by at least one of a tail cone or an exhaust outlet surface.

\* \* \* \* \*